(12) United States Patent
Iwai

(10) Patent No.: US 10,078,302 B2
(45) Date of Patent: Sep. 18, 2018

(54) IMAGE FORMATION APPARATUS

(71) Applicant: KONICA MINOLTA, INC., Chiyoda-ku, Tokyo (JP)

(72) Inventor: Katsutoshi Iwai, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/679,452

(22) Filed: Aug. 17, 2017

(65) Prior Publication Data

US 2018/0067435 A1  Mar. 8, 2018

(30) Foreign Application Priority Data

Sep. 8, 2016 (JP) .................................. 2016-175398

(51) Int. Cl.
*G03G 15/00* (2006.01)
*G03G 15/047* (2006.01)
*B41J 2/41* (2006.01)
*G03G 15/01* (2006.01)
*G03G 15/20* (2006.01)

(52) U.S. Cl.
CPC ......... *G03G 15/505* (2013.01); *G03G 15/047* (2013.01); *B41J 2/41* (2013.01); *G03G 15/0189* (2013.01); *G03G 15/2039* (2013.01); *G03G 2215/00042* (2013.01); *G03G 2215/00054* (2013.01)

(58) Field of Classification Search
CPC . G03G 15/50; G03G 15/5025; G03G 15/5029
USPC ......................................... 399/75–77, 82, 83
See application file for complete search history.

(56) References Cited

U.S. PATENT DOCUMENTS

| | | | | |
|---|---|---|---|---|
| 7,295,786 | B2 * | 11/2007 | Brinsley | ............ G03G 15/5004 399/75 |
| 8,289,532 | B2 * | 10/2012 | Asai | ...................... G06F 3/1219 399/83 |
| 9,007,609 | B2 | 4/2015 | Sakuragi | |
| 9,497,344 | B2 | 11/2016 | Kashiwagi | |

FOREIGN PATENT DOCUMENTS

| | | |
|---|---|---|
| JP | 2005352416 A | 12/2005 |
| JP | 2013081048 A | 5/2013 |
| JP | 2014027590 A | 2/2014 |
| JP | 2014033295 A | 2/2014 |
| JP | 2015159508 A | 9/2015 |

* cited by examiner

*Primary Examiner* — William J Royer
(74) *Attorney, Agent, or Firm* — Holtz, Holtz & Volek PC

(57) ABSTRACT

An image formation apparatus includes a printer configured to perform a printing process including transporting a recording medium and printing an image on the transported recording medium, and a hardware processor which determines whether the recording medium is only one sheet to be printed, and, depending on a result thereof, changes a time at which the printing process is started. Changing the time includes causing the printer to start the printing process when a first start print time is reached in a case in which the hardware processor determines that there is only one sheet to be printed, and causing the printer to start the printing process when a second start print time later than the first start print time is reached in a case in which the hardware processor determines that there is not only one sheet to be printed.

19 Claims, 8 Drawing Sheets

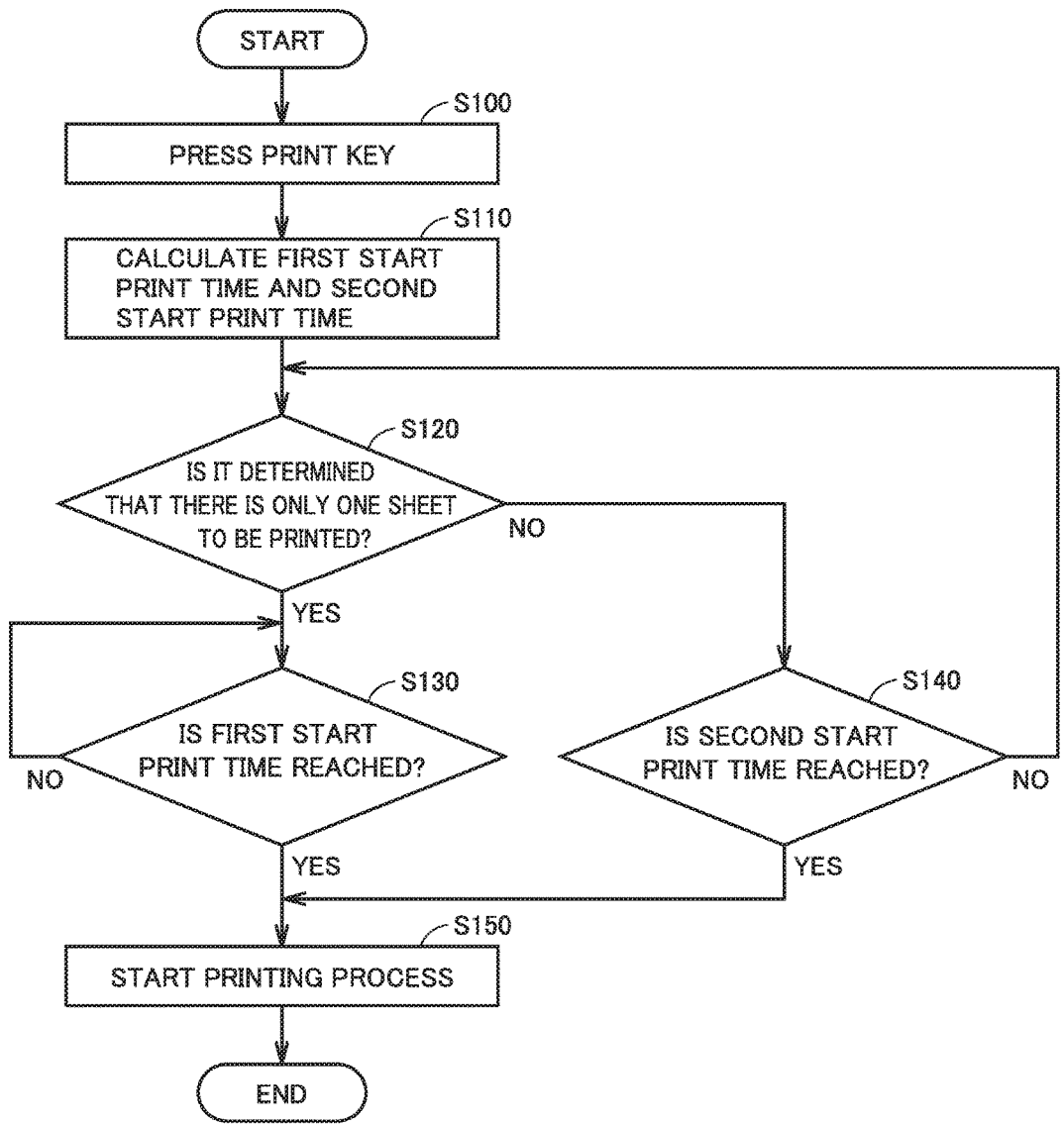

IMAGE FORMATION APPARATUS

The entire disclosure of Japanese Patent Application No. 2016-175398 filed on Sep. 8, 2016, including description, claims, drawings, and abstract, is incorporated herein by reference in its entirety.

BACKGROUND

Technological Field

This disclosure relates to an image formation apparatus, such as a copying machine, which prints an image on a recording medium.

Description of the Related Art

A first copy output time (FCOT) is an indicator for evaluating copying machines and multifunction peripherals in performance. An FCOT is a period of time (in seconds) in a normal state of use after a start button is pressed before discharging a first copying sheet is finished. Recently, shortening the FCOT is required for printing using an auto document feeder (ADF). Hereinafter, a conventional technique intended to shorten an FCOT will be introduced.

Japanese Laid-open Patent Publication No. 2015-159508 discloses a technique regarding a copying machine having a function of not printing a blank page. Specifically, when a conveyed original document is a first page, printing is started before obtaining a result of determination as to whether the document is a blank page, whereby a time before a first sheet is output can be shortened.

Japanese Laid-open Patent Publication No. 2014-33295 discloses a copying machine in which, for a job in which an original document is composed of only one sheet, printing is started without waiting for completion of reading the original document in order to reduce a period of time from start of reading to completion of printing.

Japanese Laid-open Patent Publication No. 2014-027590 discloses a copying machine which predicts a timing of completion of a reading based on at least a size of an original document or a size of a recording sheet. Based on the predicted timing of completion of the reading, a conveying means stalls conveyance of the recording sheet before a reading means completes reading the document by one sheet.

Japanese Laid-open Patent Publication No. 2013-81048 discloses a copying machine in which a timing of starting up the image forming unit to form an image on the recording sheet is determined based on first and second information. The first information indicates a period of time required after a reading unit is started up before an original document to be read is transported to a reading position. The second information indicates a period of time required after an image forming unit is started up before a recording sheet is transported to an image forming position.

Japanese Laid-open Patent Publication No. 2005-352416 discloses a copying machine in which a timing of actually starting an image forming process, such as exposing a photoreceptor drum or the like to laser light, developing a toner image, and the like, is made coincident with a timing of an end of an image reading operation, and thereby the image forming process is performed immediately after the reading operation is finished.

SUMMARY

As a result of various investigations, the present inventor has obtained findings regarding an FCOT, as follows: An FCOT is determined by three factors:

(i) Image preparation period: a period of time required for transferring an image formed on a photoreceptor to a transfer belt and transporting the image on the transfer belt to a transfer unit where transfer of the image to a sheet is synchronized with transport of the sheet;

(ii) Sheet transport period: a period of time required for feeding a sheet from a tray and transporting the sheet to the transfer unit where transport of the sheet is synchronized with transfer of an image to the sheet; and (iii) Fixing preparation period: a period of time needed for raising a temperature of a fixing unit up to a printing temperature and storing an amount of heat required for the fixing unit before the sheet is received. Although depending on the machine's configuration, a compact machine such as an A4 copying machine has a short sheet transporting path and a fixing unit storing a small amount of heat, and accordingly, the time (iii) is often rate-determining rather than the times (i) and (ii). Note that the fixing preparation period (iii) is characterized in that it varies depending on whether there is only one sheet to be printed.

In general, when the fixing unit shifts from a state where it has no sheet transported thereto and has its temperature controlled to a state where it has received a sheet, the fixing unit is deprived of heat by the sheet, and accordingly, controlled such that a heater continues to operate to maintain temperature. For successive printing, the fixing unit receives sheet successively transported thereto and is thus deprived of heat by the sheets. Accordingly, immediately after printing is started, the heater cannot raise temperature in time, and the fixing unit's temperature may be decreased. Accordingly, for successive printing, it is necessary to set a fixing preparation period to be longer to allow the fixing unit to store sufficient heat therein to hold a required temperature. On the other hand, in a case of printing only one sheet, as compared with successive printing, the fixing unit has a less decrease in temperature and accordingly, a smaller amount of heat may be stored. For this reason, in the case of single-sheet printing, the FCOT can be shortened by shortening the fixing preparation period (iii).

In order to shorten the FCOT in view of an amount of heat that is required to be stored in the fixing unit, as described above, it is necessary to recognize whether there is only one sheet to be printed or not. In a case of a flat bed scanner, the original document can only be one sheet, and accordingly, as long as the console panel is operated to set one copy for printing the document, it can be determined that there is only one sheet to be printed. In contrast, in a case of the ADF, it is possible to place on an original-document tray an original document composed of one or more sheets, and accordingly, to determine how many sheets the original document is actually composed of, it is necessary to actually transport at least one sheet thereof and thus detect that there is no original document remaining on the original-document tray. Generally, a sensor for sensing whether an original document is present or absent is installed near a most upstream portion of an original document transporting path of the ADF. Accordingly, in order to confirm that an original document is composed of one sheet, an original-document reading time for substantially one sheet will be required. The original-document reading time for one sheet is relatively long, and accordingly, in the conventional art, there has not been performed a control to change a fixing preparation period depending on whether there is only one sheet to be printed when an ADF is used.

This disclosure takes the above circumstances into consideration, and one object thereof is to provide an image formation apparatus capable of shortening an FCOT by a method also applicable to a case of transporting an original document using an ADF.

According to an embodiment, an image formation apparatus comprises: a printer configured to perform a printing process including transporting a recording medium and printing an image on the transported recording medium; and a hardware processor which determines whether the recording medium is only one sheet to be printed, and changes according to a result of the determination a time at which the print process is started. Changing the time at which the printing process is started includes causing the printer to start the printing process when a first start print time is reached in a case in which the hardware processor determines that there is only one sheet to be printed, and causing the printer to start the printing process when a second start print time later than the first start print time is reached in a case in which the hardware processor determines that there is not only one sheet to be printed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a flowchart showing a procedure for controlling a printing process.

DETAILED DESCRIPTION OF EMBODIMENTS

Hereinafter, one or more embodiments of the present invention will be described with reference to the drawings. However, the scope of the invention is not limited to the disclosed embodiments.

In the following description, identical or corresponding components are identically denoted and will not be described redundantly.

[Hardware Configuration of Image Formation Apparatus]

Figure 1:
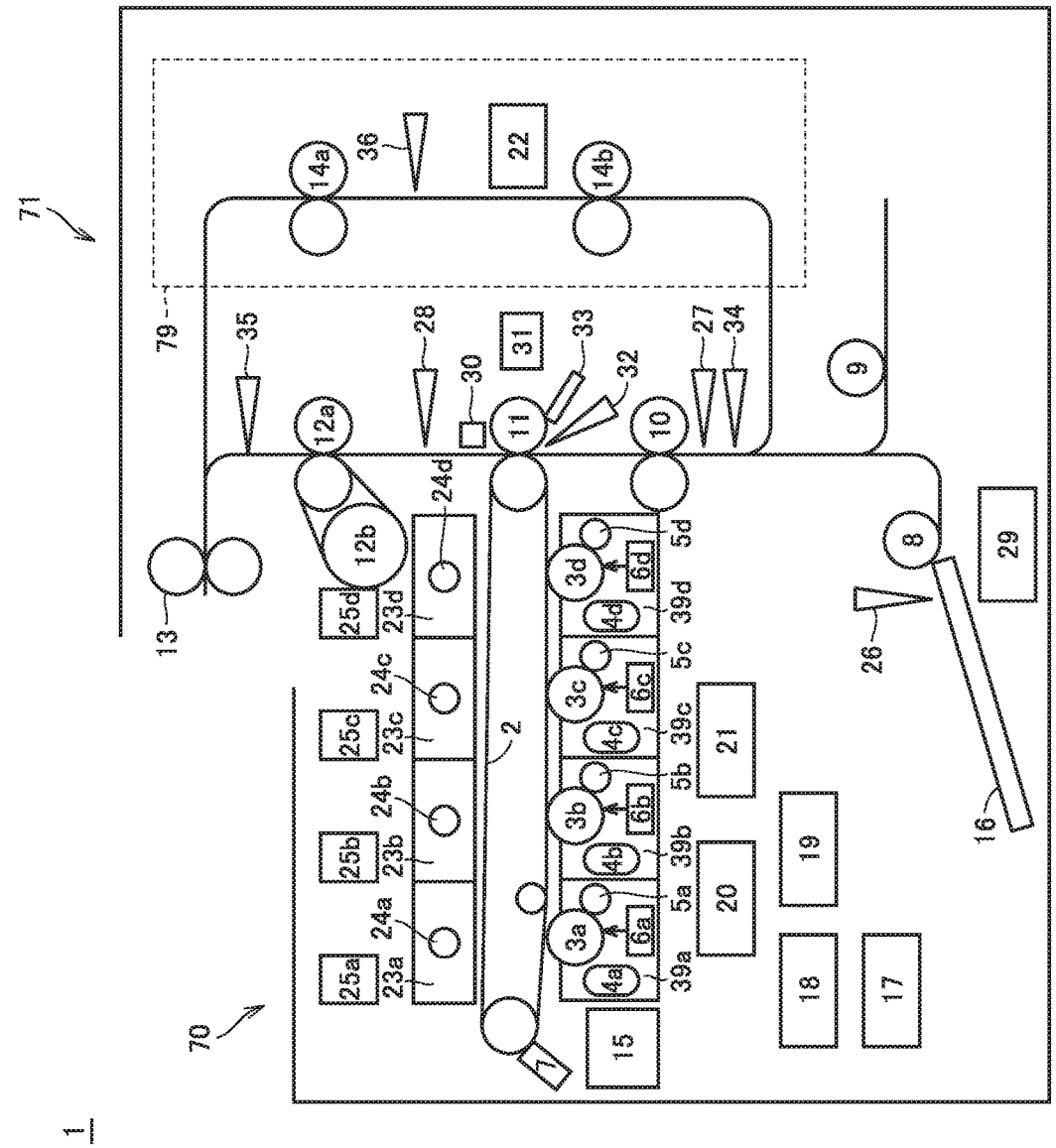
FIG. 1 is a cross-sectional view schematically showing a structure of a main portion of a tandem color printer as an example of an image formation apparatus.

FIG. 1 is a cross-sectional view schematically showing a structure of a main portion of a tandem color printer as an example of an image formation apparatus 1. The tandem color printer generally includes as its components an image forming unit 70 and a transport unit 71 shown in FIG. 1, a scanner unit 40 and an ADF (Auto Document Feeder) unit 50 shown in FIG. 2, a control unit 100, a storage device 200 and a console panel 210 shown in FIG. 3, and the like. In the following description, letters a, b, c, d at the ends of some reference characters in the figures correspond to yellow (Y), magenta (M), cyan (C) and black (K), respectively. When describing an unspecified color, the letters a to d at the ends of the reference characters are not indicated.

Image forming unit 70 includes cartridges 39a to 39d, an intermediate transfer belt 2, an intermediate transfer belt cleaner 7, a waste toner box 15, toner bottles 23a to 23d, agitating blades 24a to 24d, and toner replenishing motors 25a to 25d.

Cartridges 39a to 39d have photoreceptors 3a to 3d, charging units 5a to 5d, exposure units 6a to 6d, and developing units 4a to 4d, respectively, incorporated therein. In each of cartridge 39, photoreceptor 3 has a surface electrically charged by charging unit 5 and thereafter exposed to light by exposure unit 6 to have an electrostatic latent image formed thereon. Developing unit 4 forms a toner image by developing the electrostatic latent image formed on photoreceptor 3. Toner images of four colors are thus formed and they are primarily transferred onto intermediate transfer belt 2 such that they overlap one another. The toner image on intermediate transfer belt 2 is secondarily transferred onto a sheet (a recording medium).

Intermediate transfer belt cleaner 7 separates front intermediate transfer belt 2 the toner that has not been transferred from and thus remains on intermediate transfer belt 2. Waste toner box 15 receives the separated toner. Agitating blades 24a to 24d are incorporated in toner bottles 23a to 23d, respectively, and driven by toner replenishing motors 25a to 25d, respectively. As a result, a toner is replenished from each toner bottle 23 to a corresponding cartridge 39.

Transport unit 71 includes a recording medium accommodating unit 16, a tray elevating mechanism 29, a sensor 26 which senses an upper limit of a sheet, sheet feeding rollers 8 and 9, a timing roller 10, a secondary transfer roller 11, a pressure-contact/separation mechanism 31, a contact/separation sensor 32, a cleaning unit 33, fixing rollers 12a and 12b, a diselectrifying cloth 30, a sheet discharging roller 13, a duplex path transport rollers 14a and 14b, a fixing loop sensor 28, various motors 17 to 22, sheet sensors 34 to 36, sheet material sensor 27, and the like.

Recording medium accommodating, unit 16 accommodates a recording medium such as a sheet (also referred to as a recording sheet). Tray elevating mechanism 29 lifts recording medium accommodating unit 16 until sensor 26 senses a sheet. Sheet feeding roller 8 feeds a recording medium from recording medium accommodating unit 16. Sheet feeding roller 9 feeds a recording medium from a manual sheet feeding tray (not shown). Timing roller 10 temporarily stops a fed recording medium. Secondary transfer roller 11, which serves as a transfer unit, transfers to a recording medium a toner image formed on intermediate transfer belt 2. Diselectrifying cloth 30 diselectrifies a recording medium having a toner image transferred thereon.

Pressure-contact/separation mechanism 31 moves secondary transfer roller 11 so that secondary transfer roller 11 is pressed into contact with or separated from intermediate transfer belt 2. Contact/separation sensor 32 is a sensor, such as a photo interrupter, for sensing that secondary transfer roller 11 is pressed into contact or separated. Cleaning unit 33 removes a toner adhering to secondary transfer roller 11. Fixing rollers 12a and 12b, which serve as a fixing unit, fix a toner image transferred on a recording medium. Sheet discharging roller 13 discharges a recording medium having a toner image fixed thereon, or transports the recording medium to duplex transporting path 79. Duplex path transport rollers 14a and 14b transport a recording medium to timing roller 10 via duplex transporting path 79.

Fixing loop sensor 28 senses slack or the like of a sheet between secondary transfer roller 11 and fixing rollers 12a, 12b, and, based thereon, a speed of transporting the sheet is adjusted. Motors 17 to 21 drive photoreceptors 3a to 3d and various rollers of the transport unit 71. Motor 22 drives duplex path transport rollers 14a, 14b. Sheet material sensor 27 senses a material of a recording medium. Sheet sensors 34 to 36 sense whether a recording medium is present (and hence the position of the recording medium on a sheet transporting path (also referred to as a sheet passing path)). In particular, a plurality of sheet sensors 34 are provided in directions perpendicular and parallel to the sheet passing path and can sense a size (e.g., a width and a length) of a recording medium.

Figure 2:
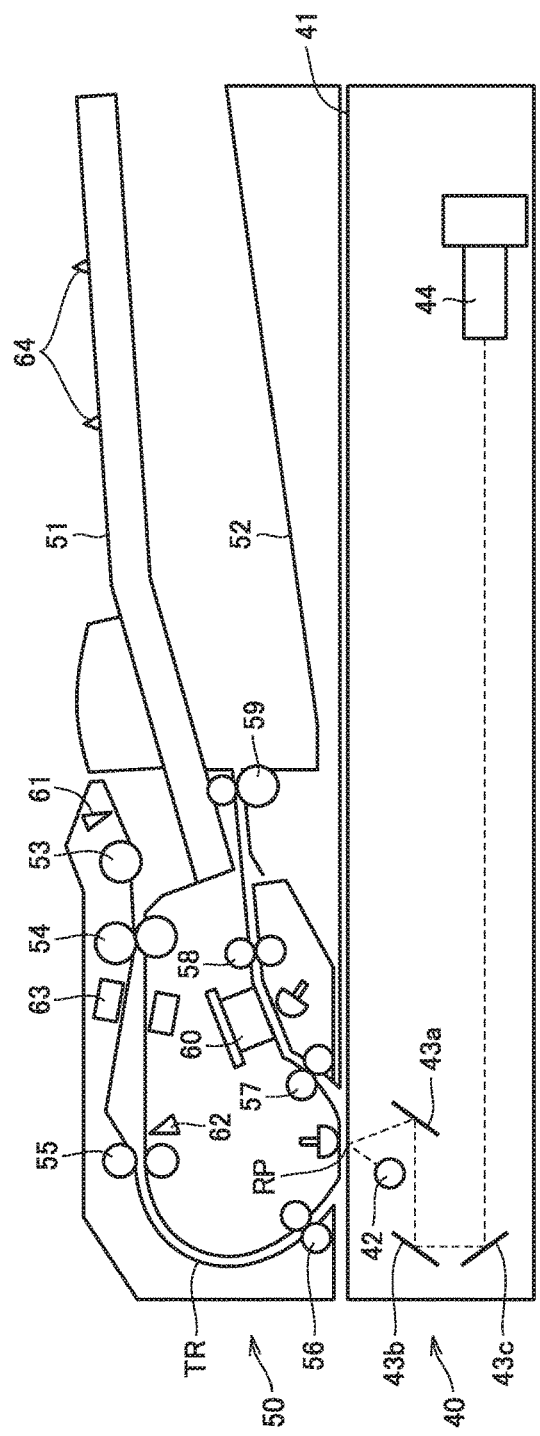
FIG. 2 is a cross-sectional view schematically showing an internal configuration of a scanner unit and an ADF unit.

FIG. 2 is a cross-sectional view schematically showing an internal configuration of scanner unit 40 and ADF unit 50. Scanner unit 40 and ADF unit 50 are disposed above image forming unit 70 and transport unit 71 shown in FIG. 1.

With reference to FIG. 2, ADF unit 50 is disposed above scanner unit 40. Scanner unit 40 is capable of reading an original document placed on a platen 41 and is also capable of reading an original document sent from ADF unit 50.

Scanner unit 40 includes platen 41, a light source 42, mirrors 43a, 43b, 43c, and a CCD (Charge Coupled Device) 44. Light emitted from light source 42 and reflected by a surface of an original document is reflected by each of mirrors 43a, 43b, 43c and thus incident on CCD 44. When reading all original document placed on platen 41, scanner unit 40 reads the document while reciprocating an optical system.

ADF unit 50 includes an original-document tray 51, a sheet discharging tray 52, a pickup roller 53, a sheet feeding roller 54, transport rollers 55 to 58, a sheet discharging roller 59, and a CIS (Contact Image Sensor) 60. When an original document is read using ADF unit 50, the optical system of the seamier unit 40 is positionally fixed.

On original-document tray 51, an original document to be read is placed. On an upper surface of original-document tray 51, an original-document size sensor 64 is provided for mechanically sensing an original document. Based on a result of detection by original-document size sensor 64, a size of an original document placed can be measured. On sheet discharging tray 52, an original document from which an image has been read is discharged from ADF unit 50

In ADF unit 50, a transporting path TR extending from original-document tray 51 to sheet discharging tray 52 is provided. Pickup roller 53, sheet feeding roller 54, transport rollers 55 to 58, and sheet discharging roller 59 are disposed in this order along transporting path TR. An original document placed on original-document tray 51 has its sheets fed one by one by these rollers to transporting path TR, and has a surface thereof read at a reading position RP. Subsequently, a back surface of the original document is read by CIS 60 provided between transport rollers 57 and 58.

ADF unit 50 includes original document sensors 61 and 62 and an ultrasonic sensor 63 disposed along transporting path TR. Original document sensors 61 and 62 sense whether there is an original document transported along transporting path TR. In particular, original document sensor 61 is provided substantially at a most upstream position of transporting path TR, and can sense whether an original document is present on original-document tray 51. Ultrasonic sensor 63 senses whether there is multiple feeding.

Figure 3:
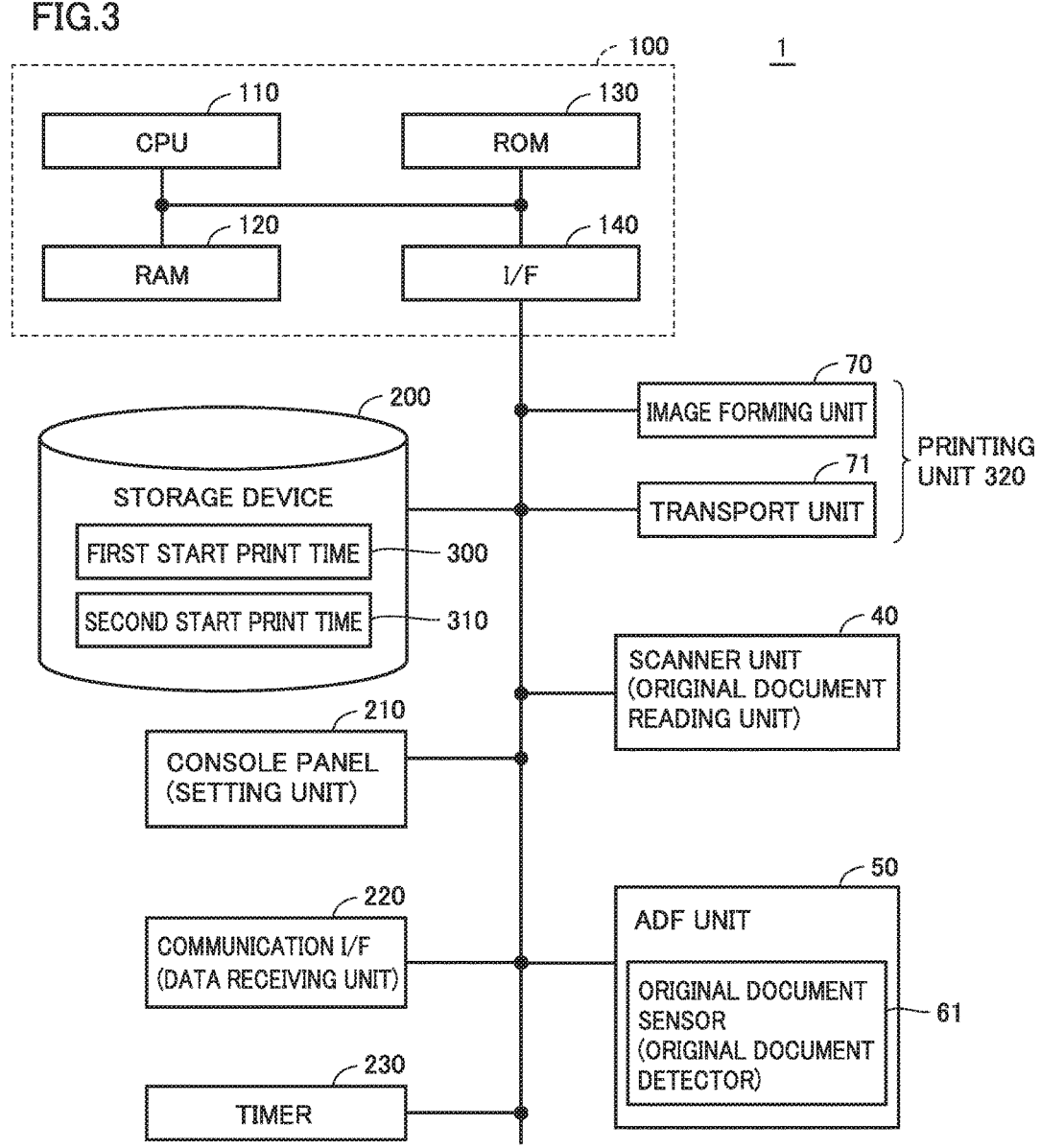
FIG. 3 is a block diagram showing an overall configuration of the image formation apparatus.

FIG. 3 is a block diagram showing an overall configuration of the image formation apparatus 1. With reference to FIG. 3, image formation apparatus 1 includes, in addition to image forming unit 70, transport unit 71, scanner unit 40 and ADF unit 50 described above, the control unit (the controller) 100, the storage device 200, the console panel 210, a communication interface (I/F) 220, and a timer 230.

Control unit 100 includes a CPU (Central Processing Unit) 110, a RAM (Random Access Memory) 120, a ROM (Read Only Memory) 130, and an interface (I/F) 140.

CPU 110 generally controls image formation apparatus 1 by reading and executing a program stored in ROM 130.

Typically, RAM 120 is a DRAM (Dynamic Random Access Memory) or the like, and temporarily stores data and image data necessary for CPU 110 to operate a program. Accordingly, RAM 120 functions as a so-called working memory.

Typically, ROM 130 is a flash memory or the like, and stores a program executed by CPU 110, various setting information involved in an operation of the image formation apparatus 1, and the like.

Interface 140 communicates various signals with an external device. Specifically, control unit 100 is electrically connected via interface 140 to storage device 200, console panel 210, communication interface 220 and timer 230, as well as image forming unit 70, transport unit 71, scanner unit 40 and ADF unit 50 having been described with reference to FIGS. 1 and 2.

Storage device 200 stores various control values including a first start print time 300 and a second start print time 310, data input via communication interface 220, and the like. First start print time 300 is a time at which a printing process is started (that is, a start up of the image forming unit 70 is initiated) in a case in which there is only one sheet to be printed. Second start print time 310 is a time at which a printing process is started (that is, the start up of the image forming unit 70 is initiated) in a case in which a plurality of sheets are successively printed.

Console panel 210 works as an input interface and allows a user to input various setting values such as a number of copies to be printed (that is, a number of sheets to be printed for each image), a printing mode, an image quality, which varies depending on a document reading speed, a sheet size, and the like. A printing mode refers to a manner of printing such as reduced printing, enlarged printing, color printing, duplex printing, pagination, and the like. Console panel 210 is further provided with a print key (a start button). When the user presses the print key, a series of operations is started starting from reading an original document through feeding a sheet and printing to discharging the sheet.

Communication interface 220 is a device for communicating with an external device. Communication interface 220 is, for example, a wireless LAN (Local Area Network) card. Image formation apparatus 1 is configured to be capable of communicating with an external device connected to a LAN or a WAN (Wide Area Network) via communication interface 220. Communication interface 220 functions as a data receiving unit that receives image data and data such as various setting values from the external device.

Timer 230 counts tune according to a command from CPU 110. Image forming unit 70 and transport unit 71 described with reference to FIG. 1 configure a printing unit 320 which prints image data on a recording medium. The image data may be generated by scanner unit 40 serving as an original document reading unit, or may be received by communication interface 220 serving as a data receiving unit.

Original document sensor 61 provided at ADF unit 50 functions as an original document sensing unit which senses whether there is an original document to be read by the original document reading unit (or scanner unit 40).

[Specific Example of FCOT in Case of Successive Printing]

In the following, a specific example of an FCOT in a case of successive printing will be described. As has been previously described, it is believed that there are three factors in determining an FCOT, as follows:

(i) Image preparation period: a period of time required for transferring an image formed on a photoreceptor to an intermediate transfer belt and transporting the image on the intermediate transfer belt to a transfer unit where transfer of the image to a sheet is synchronized with transport of the sheet;

(ii) Sheet transport period: a period of time required for feeding a sheet from a tray and transporting the sheet to the transfer unit where transport of the sheet is synchronized with transfer of an image to the sheet; and (iii) Fixing preparation period: a period of time needed for raising a fixing temperature (the temperature of the fixing unit) up to a printing temperature and storing an amount of heat required for the fixing unit before a sheet is received.

Figure 4:
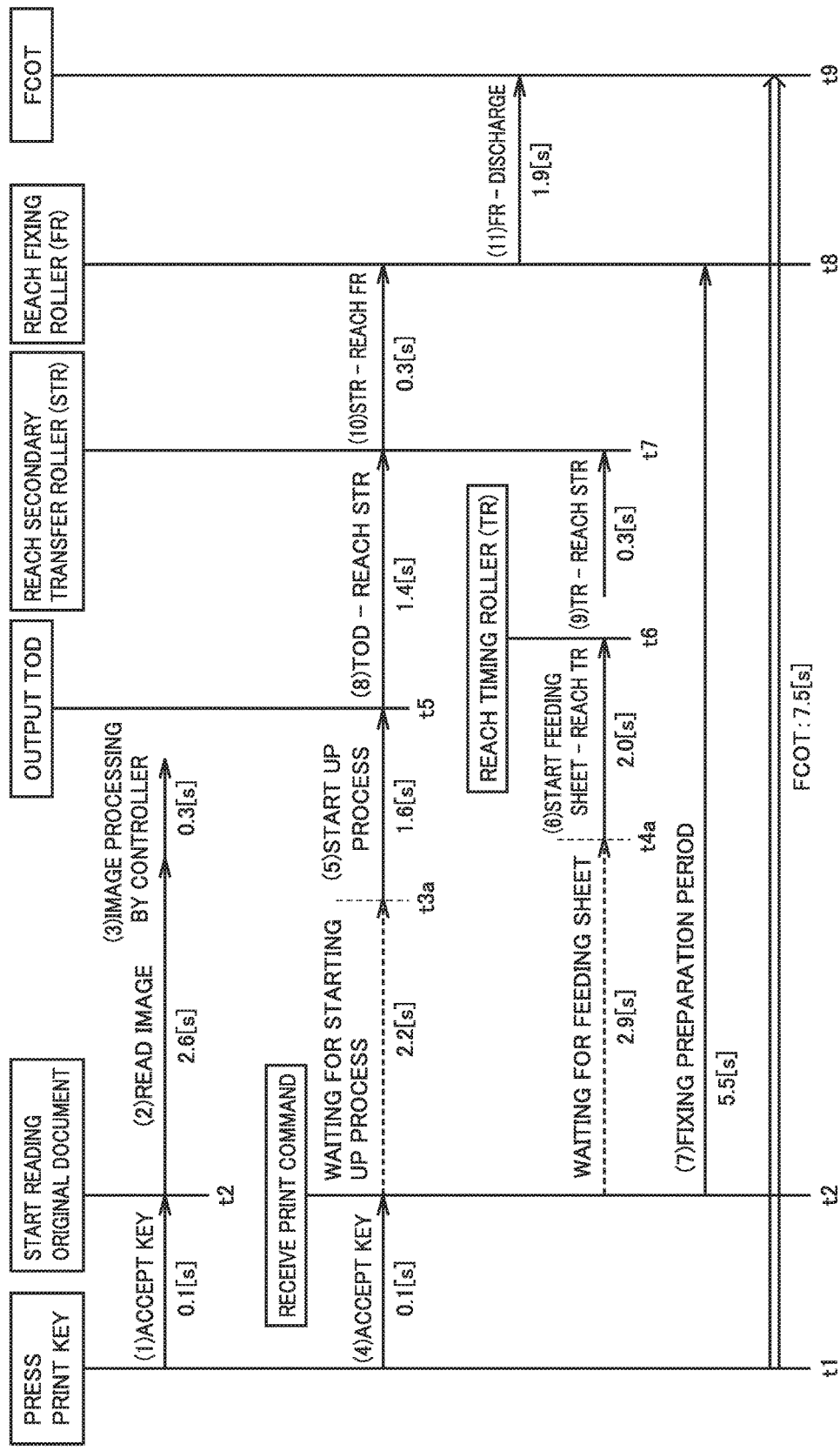
FIG. 4 is a timing plot showing a specific example of an FCOT for successive printing.

FIG. 4 is a timing plot showing a specific example of an FCOT for successive printing. The timing plot of FIG. 4 shows an example in a case in which a relationship between the three factors that determine an FCOT is in the order of fixing preparation period>image preparation period>sheet transport period. In FIG. 4, timing roller 10, secondary transfer roller 11, and fixing roller 12 of FIG. 1 are denoted as TR, STR, and FR, respectively. A time indicated for each step is an example, and it is not limited thereto.

With reference to FIGS. 3 and 4, a time required for raising the temperature of the fixing unit (or fixing roller) and storing heat therein (also referred to as a "fixing preparation period") is rate-determining. Accordingly, when the print key is pressed at time t1 and the pressing of the print key (or a print command) is received at time t2 (steps (1) and (4)), a control to raise the temperature of the fixing unit from a preparation temperature to a printing temperature is immediately started (A fixing preparation period of step (7) is started).

At time t2, furthermore, scanner unit 40 starts reading an original document placed or platen 41 (a flat bed scanner) (step (2)). When reading an image is completed, control unit 100 performs a predetermined image processing (step (3)). It should be noted that at time t2, it is already found that the original document is composed of only one sheet and a plurality of copies thereof are to be printed, i.e., successive printing is performed.

To match the rate-determining, fixing preparation period so that a fixing process can be performed at the same time when a sheet having an image transferred thereon is transported and reaches the fixing roller (FR), a start up of an image forming process by image forming unit 70 (step (5)) is initiated at time t3a (2.2 [s] after the print command is received). The start up of the process is completed at time t5, when image forming unit 70 outputs an image request signal (TOD) and starts image formation (step (8)). In this way, by performing a reverse operation from the rate-determining, fixing preparation period to determine a time to initiate the start up of the image forming process, a dead time in the image forming process such as an idling time of a photoreceptor is eliminated.

Further, in order to cause a sheet to reach the secondary transfer roller (STR) in synchronization with image forming unit 70 forming a toner image, feeding and transporting the sheet is started at time t4a (step (6)) (2.9 [s] after the print command is received). Thereafter, the sheet arrives at the timing roller (TR) at time t6, and the sheet reaches the secondary transfer roller (STR) at time t7 (step (9)).

The sheet having arrived at the secondary transfer roller (STR) receives an image secondarily transferred thereto, and arrives at the fixing roller (FR) at time t8 (step (10)). The fixing roller (FR) fixes the image on the sheet. The sheet after the image is fixed thereon is discharged by sheet discharging roller 13 at time t9 (step (11)).

In FIG. 4, a period of 5.5 seconds from time t2 to time t8 corresponds to a fixing preparation period, and a period of 7.5 seconds from time t1 to time t9 corresponds to an FCOT.

[Specific Example of FCOT in Case of Single-Sheet Printing]

Figure 5:
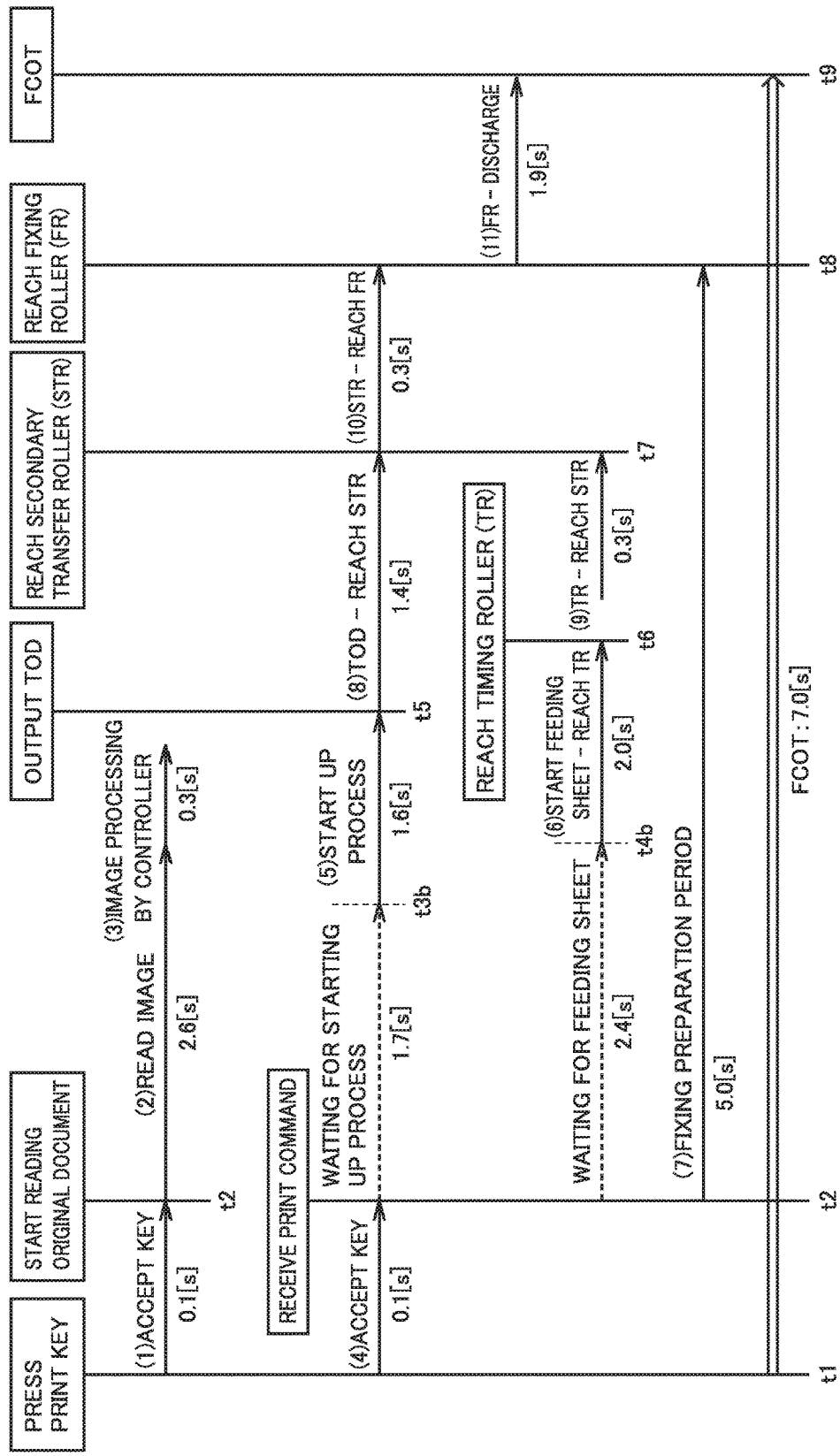
FIG. 5 is a timing plot showing a specific example of an FCOT for single-sheet printing.

FIG. 5 is a timing plot showing a specific example of an FCOT for single-sheet printing. The timing plot of FIG. 5 corresponds to the timing plot of FIG. 4. The three factors that determine an FCOT have the same relationship as the case of FIG. 4 fixing preparation period>image preparation period>sheet transport period). At time t2, i.e., when the pressing of the pint key is accepted, it is already found that the original document is composed of only one sheet (because of the flatbed scanner) and one copy thereof is to be printed, i.e., single-sheet printing is performed.

As has been discussed above, for successive printing, the fixing roller receives sheets successively and is thus deprived of heat by the sheets, and accordingly, it is necessary to store sufficient heat in the fixing roller. In contrast, for single-sheet printing, a fixing preparation period required for storing heat in the fixing roller can be shortened. Accordingly, a fixing preparation period required for storing heat is 5.5 seconds in the case of successive printing in FIG. 4, whereas it is 5.0 seconds in the case of single-sheet printing in FIG. 5, and a reduction of 0.5 second is achieved. As a result, the FCOT is also reduced from 7.5 seconds in the case of FIG. 4 to 7.0 seconds.

As the fixing preparation period has thus been shortened, the start up of the image forming process is initiated at time t3b (1.7 seconds after the print command is received), which is 0.5 second earlier than in the case of FIG. 4. Similarly, feeding a sheet is started at time t4b (2.4 seconds after the print command is received), which is 0.5 second earlier than in the case of FIG. 4.

The remainder in FIG. 5 is similar to that in FIG. 4, and accordingly, identical or corresponding portions are identically denoted and will not be described redundantly.

[Specific Example of FCOT when Original Document is Fed by ADF]

Figure 6:
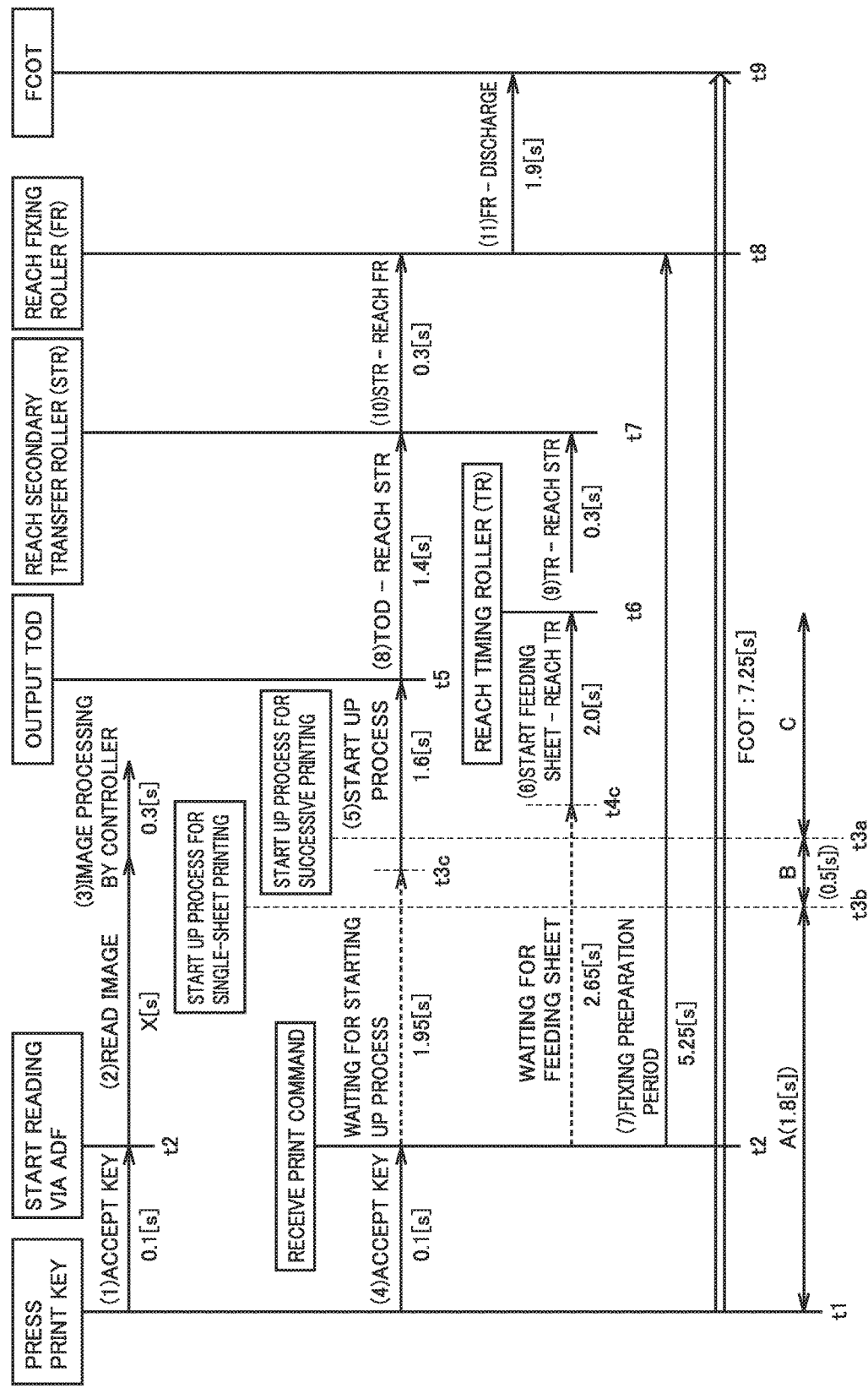
FIG. 6 is a timing plot showing a specific example of an FCOT when an original document is fed by an ADF.

FIG. 6 is a timing plot showing a specific example of an FCOT when an original document is fed by an ADF. The timing plot of FIG. 6 corresponds to the timing plots of FIGS. 4 and 5. The three factors that determine art FCOT have a relationship identical to that in the case of FIG. 4 (i.e., fixing preparation period>image preparation period>sheet transport period).

In the case of FIGS. 4 and 5, an original document is read by placing the original document on platen 41 of scanner unit 40 (i.e., by the flatbed scanner), whereas in the case of FIG. 6, an original document is read by the ADF. In that case, an image reading time varies depending on the size of the original document and is thus indefinite (represented as X [s]. Further, the original document is not necessarily one sheet.

However, in FIG. 6, for simplicity, the original document is one sheet. In that case, image reading time X [s] is substantially equal to a period of time elapsing before whether there is only one sheet to be printed or not is determined. A reason for this will be explained below with reference to FIGS. 7A and 7B.

Figure 7A:
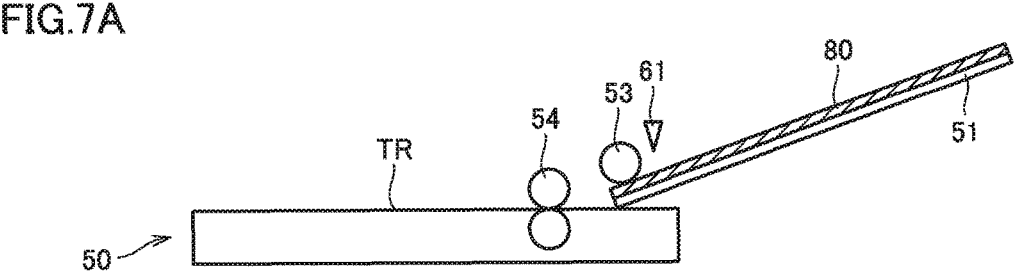
FIG. 7A is a cross-sectional view schematically showing the ADF unit (in a state in which an original document is placed on an original-document tray).
Figure 7B:
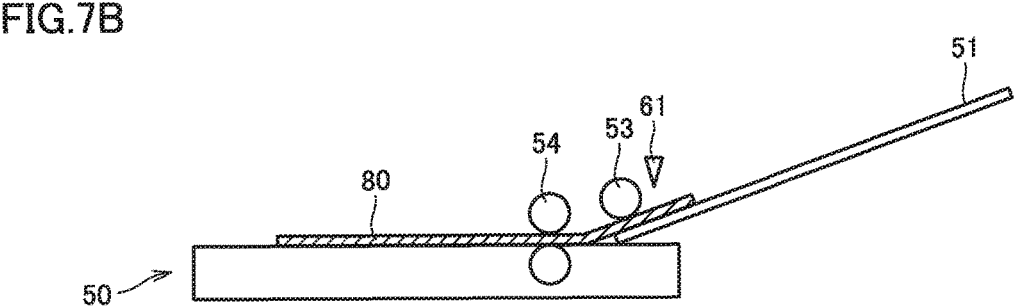
FIG. 7B is a cross-sectional view schematically showing the ADF unit (a state in which the original document has been transported by a distance corresponding to substantially one sheet thereof).

FIGS. 7A and 7B are cross-sectional views schematically showing the ADF unit 50. Referring to FIG. 7A, it is assumed that an original document 80 is placed on original-document tray 51. Original document sensor 61 is provided at a most upstream portion of original-document transporting path TR. FIG. 7B shows the original document 80 having been transported by a distance corresponding to substantially one sheet thereof). When original document sensor 61 can no longer sense the original document 80, it is determined that there is no original document 80 on original-document tray 51. Therefore, whether an original document 80 is composed of only one sheet cannot be determined unless the original document 80 is transported by a distance corresponding to substantially one sheet thereof. And a period of time for transporting an original document 80 by one sheet is substantially equal to image reading time X [s].

FIG. 6 indicates time t3b to initiate the start up of an image forming process for single-sheet printing shown in FIG. 4 (1.8 seconds after the print key is pressed) and time t3a to initiate the start up of an image forming process for successive printing shown in FIG. 5 (2.3 seconds after the print key is pressed). As shown in FIG. 6, a period of time from a time at which the print key is pressed, i.e., time t1, to time t3b is indicated as a section A, a period of time from time t3b to time t3a is indicated as a section B, and a period of time after time t3a is indicated as a section C.

The image formation apparatus 1 of the present embodiment is characterized in that, depending on in which one of sections A, B, and C a time at which it is determined that there is only one sheet to be printed (i.e., time t3c) is included, a time at which the start up of the image forming process is initiated and a time at which feeding a sheet is started vary. Some specific examples will be described below. As shown in Example 3 below, FIG. 6 shows a case in which a time at which it is determined that there is only one sheet to be printed is included in section B (2.05 seconds after the print key is pressed). For the sake of convenience, in the following specific example, it is assumed that a period of time required after reading an original document is started before it is determined that there is only one sheet to be printed is equal to image reading time X [s].

Example 1

It is assumed that the original document has a size of A4 LEF (Long Edge Feed) (width: 297 mm×length: 210 mm), and image reading time X is 1.60 seconds. When the original document is composed of one sheet and one copy thereof is to be printed, it is determined within section A that there is only one sheet to be printed. In this case, as well as in the case shown in FIG. 5, the start up of an image forming process is initiated 1.7 seconds after a print command is received, i.e., at time t3b, and feeding a sheet is started 2.4 seconds after the print command is received, i.e., at time t4b. As a result, a sheet with an image secondarily transferred thereto arrives at the fixing roller (FR) in synchronization with an elapse of a fixing preparation period of 5.0 seconds required for single-sheet printing, and a fixing process can be performed without dead time. By shortening the fixing preparation period to 5.0 seconds, the FCOT can be reduced by 0.5 second as compared with the case of successive printing.

Example 2

An original document having a size of A4 SEF (Short Edge Feed) (width: 210 mm×length: 297 mm) has a length of 297 [mm] in a feeding direction, as compared with 210 mm for A4 LEF. Accordingly, the image reading time is 2.23 [s] (=297/210×1.60), and even when the original document is composed of one sheet, a time at which it is determined that there is only one sheet to be printed is included in section C (that is, it is not determined before section B ends that there is only one sheet to be printed). In this case, to allow a fixing process to be performed immediately after a fixing preparation period of 5.5 seconds elapses, the start up of an image forming process is initiated before it is determined that there is only one sheet to be printed, i.e., at time t3a (2.3 seconds after the print key is pressed).

Accordingly, the sequence shown in FIG. 5 cannot be applied for control (more specifically, the start up of an image forming process cannot be initiated 1.8 s after the print key is pressed), and the sequence shown in FIG. 4 is applied for control (more specifically, the start up of an image forming process is initiated 2.3 s after the print key is pressed). That is, the FCOT is the same as in the case of successive printing.

Example 3

An original document having a size of B5 SEF (width: 182 mm×length: 257 mm) has a length of 257 [mm] in a feeding direction, as compared with 210 mm for A4 LEF. Accordingly, as shown in FIG. 6, the image reading time is 1.95 [s] (=257/210×1.60), and when the original document is composed of one sheet, it is determined within section B that there is only one sheet to be printed.

Accordingly, the sequence shown in FIG. 5 cannot be applied for control (more specifically, the start up of an image forming process cannot be initiated 1.8 s after the print key is pressed), however, once it has been determined that there is only one sheet to be printed, the start up of the image forming process can immediately be initiated (that is, the start up of the image forming process is initiated 2.05 s after the print key is pressed). This allows an FCOT to be reduced by 0.25 [s], as compared with that for successive printing.

Example 4

While in Example 1 an image reading time for an original document having a size of A4 LEF (width: 297 mm×length: 210 mm) is 1.60 [s], the reading speed is decreased in a reading mode with high resolution. When a reading time for a resolution of 600 dpi is 1.60 [s], then, for a resolution of 1200 dpi, the reading speed is 50%, and accordingly, image reading time X is 3.20 [s] (=1200/600×1.60). In this case, even when the original document is composed of one sheet, it is determined within section C that there is only one sheet to be printed.

Accordingly, the sequence shown in FIG. 4 is applied for control (specifically, the start up of the image forming process is initiated 2.3 s after the print key is pressed), and the FCOT will be the same as in the case of successive printing.

Example 5

An original document having a size of B6 LEF (width: 148 mm×length: 105 mm) has a length of 105 [mm] in a feeding direction, as compared with 210 mm for A4 LEF. Accordingly, the image reading time is 0.80 [s] (=105/210× 1.60), and when the original document is up to two sheets, reading the original document is completed within section A. At the time, if the current printing mode is a 2-in-1 mode, (that is, two images are paginated on one sheet and printed), it will be determined within section A (specifically, 1.6 seconds after reading an image is started) that there is only one sheet to be printed.

Accordingly, in accordance with the sequence shown in FIG. 5, the start up of art image forming process is initiated 1.8 s after the print key is pressed. As the fixing preparation period can be 5.0 seconds, the FCOT can be reduced by 0.5 second as compared with the case of successive printing.

Example 6

A case in which image data of an original document having a size of A4 LEF (width: 297 min×length: 210 mm) is received by communication from an external device connected via communication interface 220 of FIG. 3, will be described. In this case, when only one page is received at the same time, it will be determined within section A that there is only one sheet to be printed.

Accordingly, in accordance with the sequence shown in FIG. 5, the start up of an image forming process is initiated 1.8 s after the print key is pressed. As the fixing preparation period can be 5.0 seconds, the FCOT can be reduced by 0.5 second as compared with the case of successive printing.

[Case where Three Factors that Determine FCOT have a Different Relationship]

In the timing plots of FIGS. 4 to 6, as has been described above, it is assumed that the three factors that determine an FCOT have a relationship of fixing preparation period>image preparation period>sheet transport period. In contrast, how the timing plots of FIGS. 4 to 6 are changed when the relationship of the three factors that determine an FCOT is fixing preparation period>sheet transport period>image preparation period, will be described.

When the three factors have the latter relationship, it is necessary to make waiting for feeding a sheet shorter than waiting for the start up of an image forming process in FIGS. 4 and 5. Accordingly, in the case of successive printing in FIG. 4, feeding a sheet is started at time t4a, and thereafter at time t3a, the start up of an image forming process is initiated. In the case of single-sheet printing in FIG. 5, feeding a sheet is started at time t4b, and thereafter at time t3b, the start up of an image forming process is initiated.

In FIG. 6, section A will be from a time at which the print key is pressed, i.e., time t1, to a time at which feeding a sheet starts for single-sheet printing, i.e., time t4b. Section B will be from a time at which feeding a sheet starts for single-sheet printing, i.e., time t4b, to a time at which feeding a sheet starts for successive printing, i.e., time t4a. Section C is after time t4a. Accordingly, when a time at which it is determined that there is only one sheet to be printed is within section A, feeding a sheet is started at time t4b. When a time at which it is determined that there is only one sheet to be printed is within section B, feeding a sheet is immediately started once such a determination has been made. When a time at which it is determined that there is only one sheet to be printed is within section C, (i.e., when section B ends, and it is still not determined that there is only one sheet to be printed), feeding a sheet is started at time t4c.

[Procedure for Controlling Printing Process]

FIG. 8 is a flowchart showing a procedure for controlling a printing process. Hereinafter, with reference to FIGS. 3 and 8, the specific examples described above in examples 1 to 6 will be summarized.

When the print key on console panel 210 is pressed (step S100), control unit 100 (CPU 110) calculates first start print time 300 and second start print time 310, and stores them to storage device 200 (Step S110). As has been described with reference to FIG. 3, first start print time 300 is a time at which a printing process is started (that is, the start up of the image forming unit 70 is initiated) in a case in which there is only one sheet to be printed. Second start print time 310 is a time at which a printing process is started (that is, the start up of the image forming unit 70 is initiated) in a case in which a plurality of sheets are successively printed.

Note that calculating the first and second start print times when the print key is pressed is merely an example, and the calculation may be performed whenever a user operates console panel 210, such as when the user selects a sheet size, a reading resolution, and the like.

Subsequently, control unit 100 monitors that whether there is only one sheet to be printed is determined (step S120). A specific example of determining that there is only one sheet to be printed has been described above in Examples 1 to 6. When it is determined that there is only one sheet to be printed (YES in step S120), and the first start print time has not been reached (NO in step S130), control unit 100 waits until the first start print time is reached. Once the first start print time has been reached (YES in step S130), control unit 100 causes printing unit 320 to start a printing process (step S150). That is, image forming unit 70 initiates the start up of an image forming process. The above sequence corresponds to a case in which it is determined in section A shown in FIG. 6 that there is only one sheet to be printed.

In contrast, when it is determined that there is only one sheet to be printed (YES in step S120), and the first start print time has already been reached (YES in step S130), control unit 100 causes printing unit 320 to immediately start a printing process (step S150). That is, image forming unit 70 initiates the start up of an image forming process. The above sequence corresponds to a case in which it is determined in section B shown in FIG. 6 that there is only one sheet to be printed.

When it has not yet been determined that there is only one sheet to be printed (NO in step S120), control unit 100 determines whether the second start print time has been reached (step S140). As a result, when it has not yet been determined that there is only one sheet to be printed (NO in step S120), and the second start print time has been reached (YES in step S140), control unit 100 causes printing unit 320 to start a printing process (step S150). That is, image forming unit 70 initiates the start up of an image forming process. The above sequence corresponds to a case in which it is determined in section C shown in FIG. 6 that there is only one sheet to be printed. Note that when it is determined at any of the time points that there are two or more sheet to be printed, control unit 100 causes control unit 100 to start a printing process once the second start print time has been reached.

When it is not determined that there is only one sheet to be printed (NO in step S120), and the second start print time has not been reached (NO in step S140), control unit 100 will wait until it is determined that there is only one sheet to be printed (YES in step S120) or until the second start print time is reached (YES in step S140).

[Effect]

As has been described above, according to the image formation apparatus of the present embodiment, in either one of a case of reading an original document by a flat bed scanner and a case of reading an original document by an ADF, whether there is only one sheet to be printed is determined, and based on a result thereof, an appropriate fixing preparation period is set. Then, a time at which a printing process is started (specifically, an earlier one of a time at which the start up of an image forming unit is initiated and a time at which transporting a recording medium is started) can be modified, in accordance with a point in time at which it is determined that there is only one sheet to be printed, to shorten an FCOT.

Although embodiments of the present invention have been described and illustrated in detail, it is clearly understood that the same is by way of illustration and example only and not limitation, the scope of the present invention should be interpreted by terms of the appended claims.

What is claimed is:

1. An image formation apparatus comprising:
    a printer configured to perform a printing process including transporting a recording medium and printing an image on the transported recording medium; and
    a hardware processor which determines whether the recording medium is only one sheet to be printed, and, depending on a result thereof, changes a time at which the printing process is started,
    wherein changing the time includes:
        causing the printer to start the printing process when a first start print time is reached in a case in which the hardware processor determines that there is only one sheet to be printed; and
        causing the printer to start the printing process when a second start print time later than the first start print time is reached in a case in which the hardware processor determines that there is not only one sheet to be printed.

2. The image formation apparatus according to claim 1, further comprising:
    an image scanner for reading an original document;
    an original document detector for detecting whether there is an original document to be read by the image scanner; and
    an input interface for receiving a set value of a number of copies to be printed,
    wherein:
        the printer is configured to print on a recording medium an image of an original document read by the image scanner, and
        the hardware processor determines whether there is only one sheet to be printed based on a result of detection by the original document detector and the number of copies to be printed.

3. The image formation apparatus according to claim 2, wherein a timing of determining that there is only one sheet to be printed is when the original document detector detects that there is no original document.

4. The image formation apparatus according to claim 2, wherein a timing of determining that there is only one sheet to be printed varies depending on an original-document size, an original-document reading speed, and a printing mode.

5. The image formation apparatus according to claim 1, further comprising a data receiver for receiving image data and a number of copies to be printed,
    wherein:
        the printer is configured to print the received image data on a recording medium, and
        the hardware processor determines whether there is only one sheet to be printed, based on the number of copies to be printed.

6. The image formation apparatus according to claim 1, wherein:
    an amount of fixing heat required varies between a case in which there is only one sheet to be printed and a case in which there are a plurality of sheets to be printed; and
    changing the time includes causing the printer to start feeding a sheet as the recording medium at a point in time varying depending on whether there is only one sheet to be printed or there are a plurality of sheets to be printed so as to ensure the amount of fixing heat required.

7. The image formation apparatus according to claim 6, wherein an amount of fixing heat in a case in which there is only one sheet to be printed is smaller than an amount of fixing heat in a case in which there are a plurality of sheets to be printed.

8. The image formation apparatus according to claim 1, wherein in a case in which the hardware processor determines before the first start print time that there is only one sheet to be printed, the printing process is started at the first start print time.

9. The image formation apparatus according to claim 8, wherein in a case in which the hardware processor determines on or after the first start print time before the second start print time that there is only one sheet to be printed, the printing process is started at a time when the hardware processor determines that there is only one sheet to be printed.

10. The image formation apparatus according to claim 9, wherein in a case in which when the second start print time has been reached it cannot be determined that there is only one sheet to be printed, the printing process is started at the second start print time.

11. The image formation apparatus according to claim 9, wherein the second start print time is set based on a period of time required for ensuring an amount of fixing heat required in a case in which there are a plurality of sheets to be printed.

12. The image formation apparatus according to claim 8, wherein the first start print time is set based on a period of time required for ensuring an amount of fixing heat required in a case in which there is only one sheet to be printed.

13. The image formation apparatus according to claim 1, wherein a time at which the printing process is started is an earlier one of a time at which a start up of an image forming unit including a photoreceptor is initiated and a time at which transporting a recording medium is started.

14. A non-transitory computer-readable storage medium storing a program causing a computer to perform:
    determining whether a recording medium is only one sheet to be printed; and
    depending on a result of the determination, changing a time at which a printer starts to perform a printing process, wherein the printing process includes transporting a recording medium and printing an image on the transported recording medium, and wherein changing the time includes:
- causing the printer to start the printing process when a first start print time is reached in a case in which it is determined that there is only one sheet to be printed; and
- causing the printer to start the printing process when a second start print time later than the first start print time is reached in a case in which it is determined that there is not only one sheet to be printed.

15. The non-transitory computer-readable storage medium according to claim 14, wherein the program further causes the computer to:
- cause an image scanner to read an original document;
- receive from an original document detector provided at the image scanner a result of detecting whether an original document to be read is present or absent;
- print on a recording medium by the printer an image of an original document read by the image scanner; and
- receive a set value of a number of copies to be printed,
- wherein determining whether there is only one sheet to be printed is based on the result of detection by the original document detector and the number of copies to be printed.

16. The non-transitory computer-readable storage medium according to claim 15, wherein a timing of determining that there is only one sheet to be printed is when the original document detector detects that there is no original document.

17. The non-transitory computer-readable storage medium according to claim 15, wherein a timing of determining that there is only one sheet to be printed varies depending on an original-document size, an original-document reading speed, and a printing mode.

18. The non-transitory computer-readable storage medium according to claim 14, wherein the program further causes the computer to:
- receive image data and a number of copies to be printed; and
- cause the printer to print the received image data on a recording medium,
- wherein determining whether there is only one sheet to be printed is based on the number of copies to be printed.

19. The non-transitory computer-readable storage medium according to claim 14, wherein:
- an amount of fixing heat required varies between a case in which there is only one sheet to be printed and a case in which there are a plurality of sheets to be printed; and
- changing the time includes causing the printer to start feeding a sheet as the recording medium at a point in time varying depending on whether there is only one sheet to be printed or there are a plurality of sheets to be printed so as to ensure the amount of fixing heat required.

* * * * *